US011960724B2

United States Patent
Choi et al.

(10) Patent No.: US 11,960,724 B2
(45) Date of Patent: Apr. 16, 2024

(54) DEVICE FOR DETECTING ZONE PARALLELITY OF A SOLID STATE DRIVE AND OPERATING METHOD THEREOF

(71) Applicants: SK hynix Inc., Icheon (KR); Industry-Academic Cooperation Foundation, Dankook University, Yongin (KR)

(72) Inventors: Jongmoo Choi, Yongin (KR); Myunghoon Oh, Yongin (KR)

(73) Assignees: SK hynix Inc., Icheon (KR); Industry-Academic Cooperation Foundation, Dankook University, Yongin (KR)

( * ) Notice: Subject to any disclaimer, the term of this patent is extended or adjusted under 35 U.S.C. 154(b) by 49 days.

(21) Appl. No.: 17/929,651

(22) Filed: Sep. 2, 2022

(65) Prior Publication Data

US 2023/0078249 A1   Mar. 16, 2023

(30) Foreign Application Priority Data

Sep. 13, 2021   (KR) .......................... 10-2021-0122054

(51) Int. Cl.
*G06F 3/06*   (2006.01)

(52) U.S. Cl.
CPC ............ *G06F 3/061* (2013.01); *G06F 3/0653* (2013.01); *G06F 3/0679* (2013.01)

(58) Field of Classification Search
None
See application file for complete search history.

(56) References Cited

U.S. PATENT DOCUMENTS

| 11,789,611 B2* | 10/2023 | Singh ................... G06F 3/0631 711/102 |
| 2009/0150894 A1* | 6/2009 | Huang .................. G06F 3/0688 710/22 |
| 2019/0042150 A1 | 2/2019 | Wells et al. |

(Continued)

FOREIGN PATENT DOCUMENTS

KR   10-2020-0016809 A   2/2020

OTHER PUBLICATIONS

B. Mao, S. Wu and L. Duan, "Improving the SSD Performance by Exploiting Request Characteristics and Internal Parallelism," in IEEE Transactions on Computer-Aided Design of Integrated Circuits and Systems, vol. 37, No. 2, pp. 472-484, Feb. 2018, doi: 10.1109/TCAD.2017.2697961. (Year: 2018).*

(Continued)

*Primary Examiner* — Edward J Dudek, Jr.
*Assistant Examiner* — Ralph A Verderamo, III

(57) ABSTRACT

A device for detecting zone parallelity includes a detection control circuit configured to generate respective first and second requests for first and second zones among a plurality of zones included in a solid state drive (SSD). An SSD controller is configured to control the SSD by generating a first command and a second command corresponding to the first request and the second request, respectively, and to schedule the first command and the second command. The detection control circuit determines zone parallelity of the first and second zones using response characteristics of the responses of the SSD to the first request and the second request. The response characteristics may include a latency of a response.

10 Claims, 4 Drawing Sheets

(56) References Cited

U.S. PATENT DOCUMENTS

| | | | |
|---|---|---|---|
| 2020/0264978 A1* | 8/2020 | Li | G06F 3/0611 |
| 2022/0197553 A1* | 6/2022 | BenHanokh | G06F 3/0659 |
| 2022/0261160 A1* | 8/2022 | Sun | G06F 3/0644 |

OTHER PUBLICATIONS

C. Mellor, "Intel launches three new Optane drives," Dec. 16, 2020, https://blocksandfiles.com/2020/12/16/intel-launches-three-new-optane-drives-one-is-worlds-fastest-ssd/.

"Samsung previews next-generation memory solutions," Samsung Tech Blog, Sep. 4, 2019. https://semiconductor.samsung.com/newsroom/tech-blog/previews-samsungs-next-generation-memory-solutions/.

"Samsung Successfully Develops Industry's First "Key Value" SSD Prototype that Meets New Open Standard," BusinessWire, Sep. 4, 2019. https://www.businesswire.com/news/home/20190904005819/en/Samsung-Successfully-Develops-Industry.

Y. Hwan-Jin et al., "SK Hynix runs first demo on next-generation enterprise SSD," Pulse by Maeil Business News Korea, Mar. 2019, https://pulsenews.co.kr/view.php?sc=30800018&year=2019&no=179264.

"Zoned Storage," Western Digital, 2021, https://www.wd.com/content/western-digital/en-us/company/innovations/zoned-storage.html.

"SK hynix Demonstrated Zoned Namespaces SSD Solution For Datacenters," CDR info, Mar. 25, 2019. https://www.cdrinfo.com/d7/content/sk-hynix-demonstrated-zoned-namespaces-ssd-solution-datacenters.

"Zoned Storage For Future Data Centers," CMU, Sep. 30, 2020. https://www.pdl.cmu.edu/ZonedStorage/.

J. Hands et al., "NVMe 2.0 Specification Preview," SDC, Storage Developer Conference, Sep. 2020.

A. Aghayev et al., "File systems unfit as distributed storage backends: lessons from 10 years of Ceph evolution," Proceedings of the 27th ACM Symposium on Operating Systems Principles, Oct. 2019.

L. Bindschaedler et al., "Hailstorm: Disaggregated compute and storage for distributed LSM-based databases," Proceedings of the Twenty-Fifth International Conference on Architectural Support for Programming Languages and Operating Systems, Mar. 2020.

Lim, Hyeontaek, et al. "SILT: A memory-efficient, high-performance key-value store," Proceedings of the Twenty-Third ACM Symposium on Operating Systems Principles, Oct. 2011.

B. Debnath et al., "FlashStore: High throughput persistent key-value store," Proceedings of the VLDB Endowment 3.1-2 (2010): 1414-1425, Sep. 2010.

S. Weil et al., "Ceph: A scalable, high-performance distributed file system," Proceedings of the 7th symposium on Operating systems design and implementation, Nov. 2006.

D. Andersen et al., "FAWN: A fast array of wimpy nodes," Proceedings of the ACM SIGOPS 22nd symposium on Operating systems principles, Oct. 2009.

Z. Liu et al., "DistCache: Provable Load Balancing for Large-Scale Storage Systems with Distributed Caching," 17th USENIX Conference on File and Storage Technologies (FAST 19), Feb. 2019.

R. Sumbaly et al., "Serving large-scale batch computed data with project Voldemort," FAST. vol. 12, Feb. 2012.

M. Bailleu, et al., "Avocado: A Secure In-Memory Distributed Storage System," 2021 USENIX Annual Technical Conference (USENIX ATC 21), Jul. 2021.

G. Decandia et al., "Dynamo: Amazon's highly available key-value store," ACM SIGOPS operating systems review 41.6 (2007): 205-220, Oct. 2007.

J. Hwang et al., "Rearchitecting linux storage stack for US latency and high throughput," 15th USENIX Symposium on Operating Systems Design and Implementation (OSDI 21), Jul. 2021.

S. Ghemawat et al., "The Google file system," Proceedings of the nineteenth ACM symposium on Operating systems principles, Oct. 2003.

Y. Dai et al., "From WiscKey to Bourbon: A Learned Index for Log-Structured Merge Trees," 14th USENIX Symposium on Operating Systems Design and Implementation (OSDI 20), Nov. 2020.

Z. Cao et al., "Characterizing, Modeling, and Benchmarking RocksDB Key-Value Workloads at Facebook," 18th USENIX Conference on File and Storage Technologies (FAST 20), Feb. 2020.

O. Balmau et al., "SILK: Preventing Latency Spikes in Log-Structured Merge Key-Value Stores," 2019 USENIX Annual Technical Conference (USENIX ATC 19), Jul. 2019.

l. Lersch et al., "Enabling low tail latency on multicore key-value stores," Proceedings of the VLDB Endowment 13.7 (2020): 1091-1104, Mar. 2020.

B. Chandramouli et al., "Faster: A concurrent key-value store with in-place updates," Proceedings of the 2018 International Conference on Management of Data, Jun. 2018.

P. Raju et al., "Pebblesdb: Building key-value stores using fragmented log-structured merge trees," Proceedings of the 26th Symposium on Operating Systems Principles, Oct. 2017.

L. Lu et al., "Wisckey: Separating keys from values in ssd-conscious storage," ACM Transactions on Storage (TOS) 13.1 (2016): 1-28, Feb. 2016.

T. Yao, et al., "MatrixKV: Reducing Write Stalls and Write Amplification in LSM-tree Based KV Stores with Matrix Container in NVM," 2020 USENIX Annual Technical Conference (USENIX ATC 20), Jul. 2020.

W. Zhong et al., "REMIX: Efficient Range Query for LSM-trees," 19th USENIX Conference on File and Storage Technologies (FAST 21), Feb. 2021.

Y. Chen, et al., "Flatstore: An efficient log-structured key-value storage engine for persistent memory." Proceedings of the Twenty-Fifth International Conference on Architectural Support for Programming Languages and Operating Systems. Mar. 2020.

O. Balmau et al., "Flodb: Unlocking memory in persistent key-value stores," Proceedings of the Twelfth European Conference on Computer Systems, Apr. 2017.

T. Yao et al., "GearDB: A GC-free Key-Value Store on HM-SMR Drives with Gear Compaction," 17th USENIX Conference on File and Storage Technologies (FAST 19), Feb. 2019.

H. Chen et al., "SpanDB: A Fast, Cost-Effective LSM-tree Based KV Store on Hybrid Storage," 19th USENIX Conference on File and Storage Technologies (FAST 21), Feb. 2021.

S. Luo et al., "Rosetta: A robust space-time optimized range filter for key-value stores," Proceedings of the 2020 ACM SIGMOD International Conference on Management of Data, Jun. 2020.

K. Han et al., "ZNS+: Advanced zoned namespace interface for supporting in-storage zone compaction," 15th USENIX Symposium on Operating Systems Design and Implementation (OSDI 21), Jul. 2021.

M. Bjørling et al., "ZNS: Avoiding the Block Interface Tax for Flash-based SSDs," 2021 USENIX Annual Technical Conference (USENIX ATC 21), Jul. 2021.

J. Im et al., "PinK: High-speed In-storage Key-value Store with Bounded Tails," 2020 USENIX Annual Technical Conference (USENIX ATC 20), Jul. 2020.

S. Liang et al., "Cognitive Ssd: A Deep Learning Engine for In-Storage Data Retrieval," 2019 USENIX Annual Technical Conference (USENIX ATC 19), Jul. 2019.

Y. Kang et al., "Towards building a high-performance, scale-in key-value storage system," Proceedings of the 12th ACM International Conference on Systems and Storage, Jun. 2019.

M. Wilkening et al., "RecSSD: near data processing for solid state drive based recommendation inference," Proceedings of the 26th ACM International Conference on Architectural Support for Programming Languages and Operating Systems, Apr. 2021.

Y. Jin et al., "KAML: A flexible, high-performance key-value SSD," 2017 IEEE International Symposium on High Performance Computer Architecture (HPCA), IEEE, Feb. 2017.

Z. Shen et al., "Didacache: A Deep integration of device and application for flash-based key-value caching," ACM Transactions on Storage (TOS) 14.3 (Feb. 2017): 1-32, Feb. 2017.

J. Ouyang et al., "SDF: Software-defined flash for web-scale internet storage systems," Proceedings of the 19th International

(56) References Cited

OTHER PUBLICATIONS conference on Architectural support for programming languages and operating systems, Mar. 2014.

L. Marmol et al., "NVMKV: A Scalable, Lightweight, FTL-aware Key-Value Store," 2015 USENIX Annual Technical Conference (USENIX ATC 15), Jul. 2015.

G. Choi et al., "A New LSM-style Garbage Collection Scheme for ZNS SSDs," 12th USENIX Workshop on Hot Topics In Storage and File Systems (HotStorage 20), Jul. 2020.

J. Zhang et al., "FlashKV: Accelerating KV performance with open-channel SSDs," ACM Transactions on Embedded Computing Systems (TECS) 16.5s (2017): Sep. 1-19, 2017.

T. Stavrinos et al., "Don't Be a Blockhead: Zoned Namespaces Make Work on Conventional SSDs Obsolete," HotOS'21, Jun. 2021.

H. Holmberg, "Accelerating RocksDB with Zoned SSDs", SDC, Sep. 2019.

J. Mohan et al., "CheckFreq: Frequent, Fine-Grained DNN Checkpointing." 19th USENIX Conference on File and Storage Technologies (FAST 21). Feb. 2021.

D. Landsman, "Standardizing Zones Across the Storage Ecosystem", Flash Memory Summit 2019, Aug. 6, 2019.

M. Bjørling et al., "LightNVM: The Linux Open-Channel SSD Subsystem," 15th USENIX Conference on File and Storage Technologies (FAST 17), Feb. 2017.

S. Dong et a,l. "Evolution of Development Priorities in Key-value Stores Serving Large-scale Applications: The RocksDB Experience," 19th USENIX Conference on File and Storage Technologies (FAST 21), Feb. 2021.

T. Kim et al., "Fully Automatic Stream Management for Multi-Streamed SSDs Using Program Contexts", FAST'19, Feb. 2019.

\* cited by examiner

DEVICE FOR DETECTING ZONE PARALLELITY OF A SOLID STATE DRIVE AND OPERATING METHOD THEREOF

CROSS-REFERENCE TO RELATED APPLICATION

The present application claims priority under 35 U.S.C. § 119(a) to Korean Patent Application No. 10-2021-0122054, filed on Sep. 13, 2021, which is incorporated herein by reference in its entirety.

BACKGROUND

1. Technical Field

Various embodiments generally relate to a device for detecting zone parallelity of a solid state drive (SSD) and an operating method thereof and more specifically to a device for detecting zone parallelity of a Zoned Namespace (ZNS) SSD and an operating method thereof.

2. Related Art

A ZNS SSD is being developed as a next-generation SSDs.

A ZNS SSD groups storage space of the SSD into multiple zones, where each zone can be read randomly, but write operations within each zone are performed sequentially.

As such, the ZNS SSD has improved write performance and Quality of Service (QoS) as a result of an improvement in internal data arrangement compared to previous types of SSDs.

An SSD may include multiple channels, which can be accessed independently from each other. In addition, a plurality of ways may be assigned to each channel and different ways may operate independently within a channel.

A number of zones included in the ZNS SSD are mapped to channels and ways. Two zones mapped to different channels can be accessed in parallel to improve performance, while two zones included in the same channel cannot be accessed at the same time and performance may be degraded due to interference.

Currently, there is no predetermined rule for mapping a plurality of zones to channels and ways, and each manufacturer uses their own method for the mapping. As a result, a system using a ZNS SSD cannot know the mapping of zones to channels and ways in advance.

SUMMARY

In accordance with an embodiment of the present disclosure, a device for detecting parallelity may include a detection control circuit configured to generate a first request and a second request for two zones among a plurality of zones included in a solid state drive (SSD); and an SSD controller configured to control the SSD by generating a first command and a second command corresponding to the first request and the second request, respectively, wherein the SSD controller schedules the first command and the second command, and wherein the detection control circuit determines zone parallelity of the two zones using response characteristics of the SSD for the first request and the second request.

In accordance with an embodiment of the present disclosure, a method for detecting zone parallelity may include selecting two zones from among a plurality of zones of a solid state drive (SSD); providing commands for the two zones to an SSD; measuring response characteristics of the SSD after providing the commands for the two zones to the SSD; and determining the zone parallelity of the two zones based on the response characteristics.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
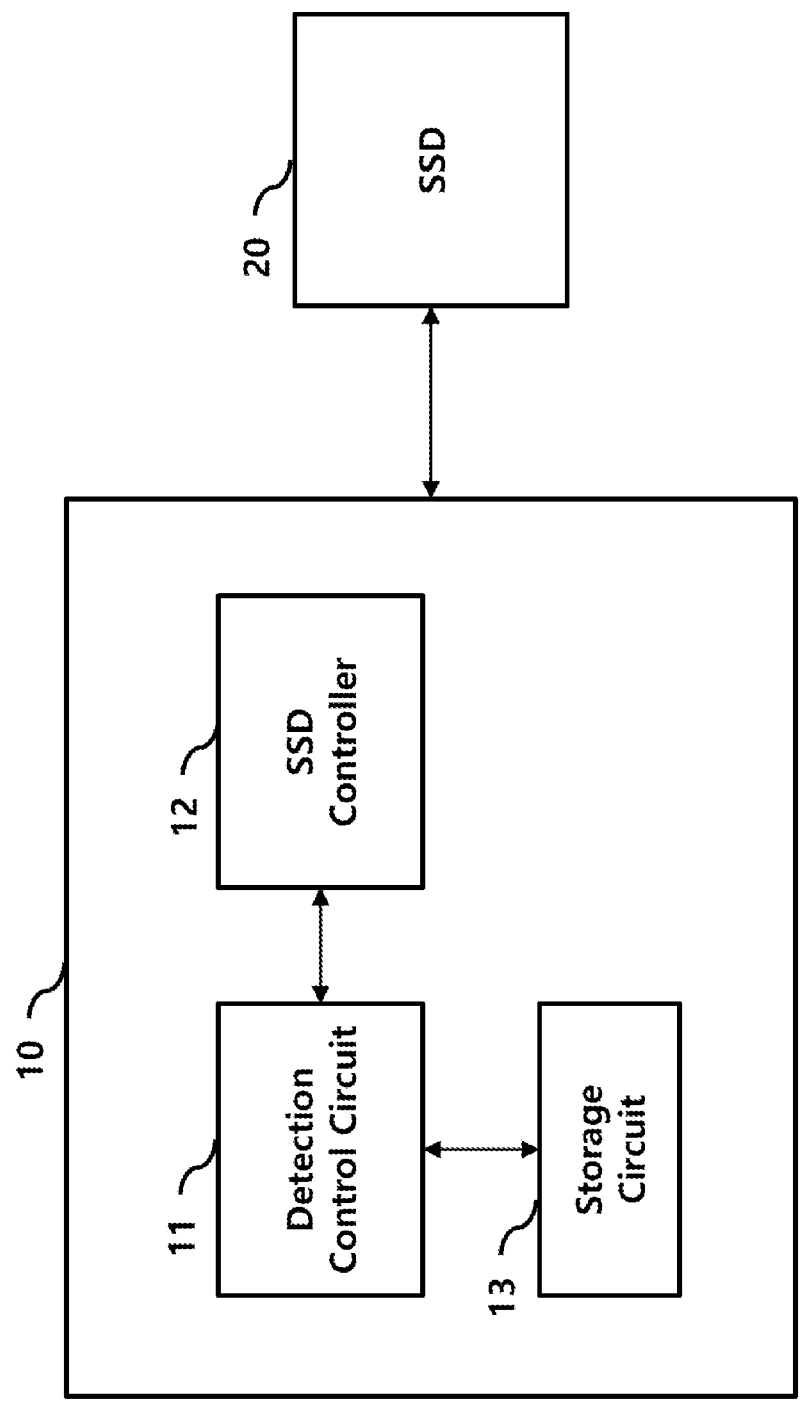
FIG. 1 is a block diagram of a device for detecting zone parallelity according to an embodiment of the present disclosure.

FIG. 1 is a block diagram of a device 10 for detecting zone parallelity according to an embodiment of the present disclosure.

The device 10 for detecting zone parallelity includes a detection control circuit 11, an SSD controller 12, and a storage circuit 13.

The detection control circuit 11 controls detection operations to be described below and may comprise hardware, software, or a combination of hardware and software.

The SSD controller 12 generates a command corresponding to a request provided by the detection control circuit 11 to perform a read or write operation on the SSD 20.

For example, the detection control circuit 11 may generate read requests for two zones, respectively, of the SSD 20 and provide the read requests to the SSD controller 12.

The SSD controller 12 provides read commands corresponding to the read requests for the two zones of the SSD 20 provided from the detection control circuit 11 to the SSD 20, and receives processing results or responses from the SSD 20.

In this case, the SSD controller 12 provides the read commands corresponding to the read requests for the two zones to the SSD 20 at substantially the same time.

For example, the read commands for the two zones may be scheduled simultaneously or sequentially and provided to the SSD 20.

When two read commands are sequentially scheduled, the time between the respective issuing times of the two read commands should be sufficiently short compared to a latency of the response of the SSD to the read commands, for example, 1% or less of the latency.

The detection control circuit 11 determines zone parallelity by using respective response times to the read requests for the two zones.

In this embodiment, the SSD 20 is a ZNS SSD, and commands necessary for a read and a write operation on the ZNS SSD are commands from an NVMe ZNS command set of a standard such as the NVM Express® Zoned Namespace Command Set Specification.

Accordingly, a detailed description of the read and write operations for the ZNS SSD 20 by the SSD controller 12 will be omitted.

Figure 2:
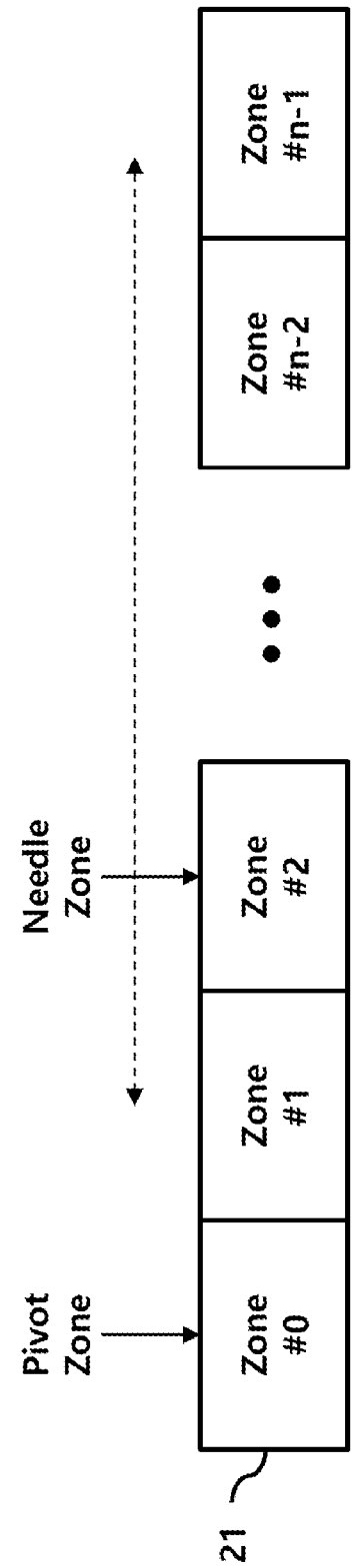
FIG. 2 illustrates a pivot zone and a needle zone in an SSD according to an embodiment of the present disclosure.

FIG. 2 illustrates a pivot zone and a needle zone in the SSD 20 according to an embodiment of the present disclosure.

The SSD 20 is a ZNS SSD, and a storage space within the SSD is divided into a plurality of zones 21.

The detection control circuit 11 selects a pivot zone and a needle zone for detecting zone parallelity.

For example, if zone #0 is selected as the pivot zone, one of zones #1 though #n−1 can be selected as the needle zone.

After that, when the pivot zone is changed to zone #1, one of zones #2 through #n−1 can be selected as the needle zone.

Figure 3:
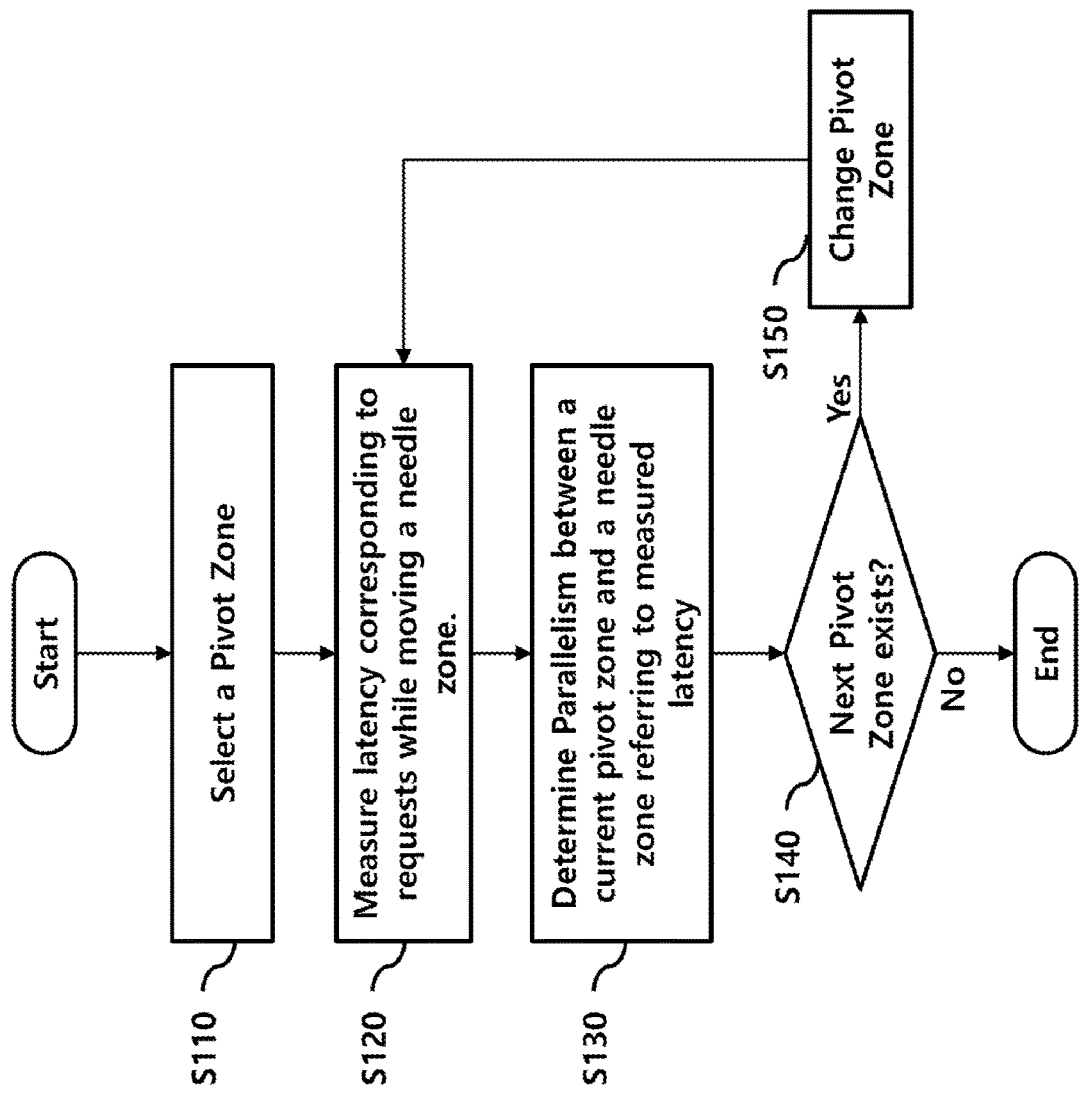
FIG. 3 is a flowchart of an operation of a device for detecting zone parallelity according to an embodiment of the present disclosure.

FIG. 3 is a flowchart illustrating an operation of the device 10 for detecting zone parallelity.

First, the pivot zone is selected at S110.

Thereafter, while moving the needle zone, latency corresponding to requests is measured at S120.

In this case, the requests are, for example, read requests.

As described above, if zone #0 is selected as the pivot zone, one of zones #1 through #n−1 may be selected as the needle zone. In an embodiment, each of the zones #1 through #n−1 is selected in turn as the needle zone.

For each selected needle zone, the detection control circuit 11 generates a request for the pivot zone and a request for the needle zone, provides them to the SSD controller 12, and records respective response times (that is, latencies) to the two requests. Accordingly, for each zone selected as the needle zone, a pair of requests comprising a request for the pivot zone and a request for the zone currently selected as the needle zone are generated, and respective pairs of latencies for each pair of requests are recorded, each pair of latencies including a latency of a command to the pivot zone and a latency of a command to the zone currently-selected as the needle zone.

For each pair of requests, the SSD controller 12 may schedule two commands corresponding to the request for the pivot zone and the request for the currently-selected needle zone at the same time or sequentially, and provide them to the SSD 20.

Thereafter, zone parallelity between the current pivot zone and the needle zone is determined with reference to the measured latencies at S130. In an embodiment, the latency used to determine the zone parallelity of a pivot zone and a needle zone corresponds to the greater of the latency of the command sent to the pivot zone and the latency of the corresponding command sent to the needle zone. In another embodiment, the latency used to determine the zone parallelity of the pivot zone and the needle zone corresponds to the sum or the average of the latency of the command sent to the pivot zone and the latency of the corresponding command sent to the needle zone.

Figure 4:
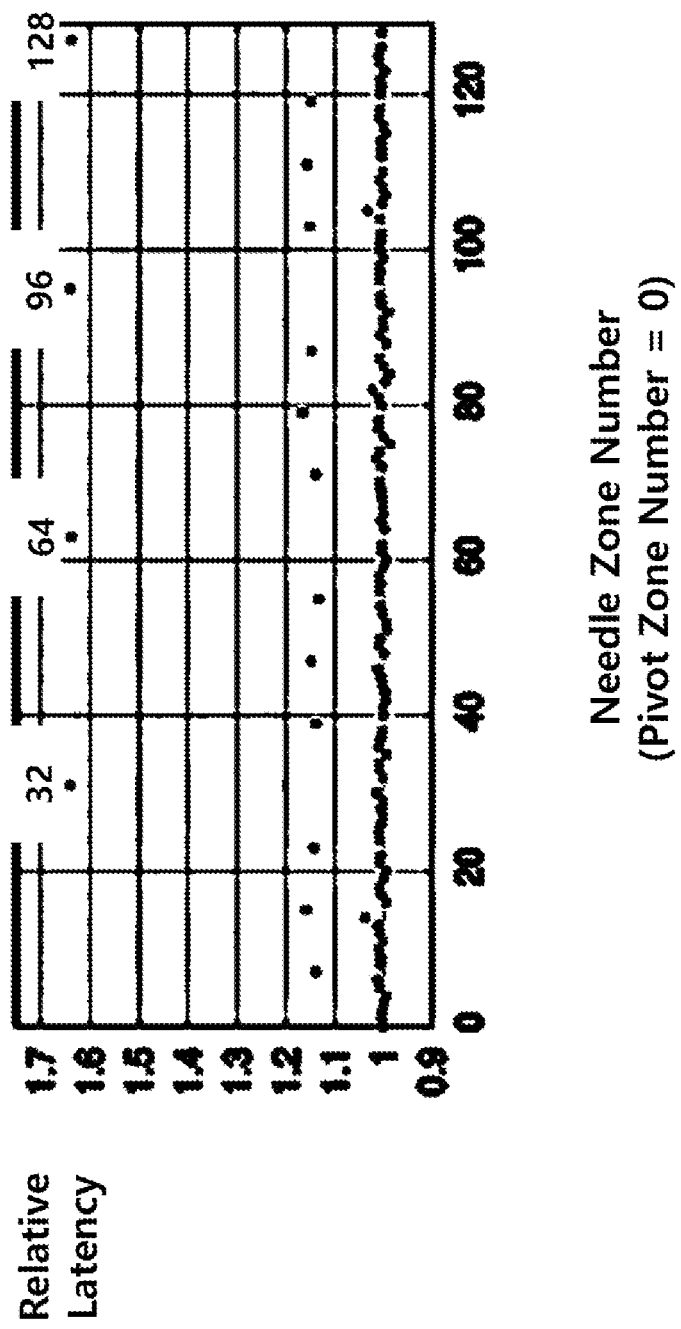
FIG. 4 is a graph showing relative performance of a needle zone relative to a pivot zone according to an embodiment of the present disclosure.

FIG. 4 is a graph showing relative latency for the needle zones #1 through #129 when the pivot zone is zone #0 and n is 130. In the graph, a reference latency corresponding to a lowest among latencies used to determine zone parallelity is normalized to 1 to determine a normalizing factor, and the other latencies are normalized to respective relative latencies using the same normalizing factor.

In the present embodiment, when performance difference of 50% or more is shown, that is, when the relative latency is equal to or greater than 1.5, it is determined that there is no zone parallelity. Accordingly, in one embodiment, when the greater of a latency of a command sent to a pivot zone and a latency of a corresponding command sent to a needle zone is 50% or more higher than the reference latency, it is determined that there is no zone parallelity between that pivot zone and that needle zone; and in another embodiment, when the sum or average of a latency of a command sent to a pivot zone and a latency of a corresponding command sent to a needle zone is 50% or more higher than the reference latency, it is determined that there is no zone parallelity between that pivot zone and that needle zone.

In the graph, it can be seen that when the pivot zone is zone #0 and the needle zone is one of zones #32, #64, #96, and #128, latency is increased by about 70% compared to when the other zones are the needle zone.

Through this, it is determined that zones #32, #64, #96, and #128 do not have zone parallelity with zone #0, and the remaining zones excluding them are determined to have zone parallelity with zone #0.

In the graph of FIG. 4, there are zones in which the relative latency is measured between 1.1 and 1.2, and these indicate a performance degradation of about 10 to 20%.

In embodiments, it is assumed that this level of difference is due to a collision that occurs when using other resources such as an interface and an SSD controller, and is not due to a lack of zone parallelity. That is, it is determined that these zones have zone parallelity to zone #0.

In the embodiment described above, the zone parallelity is determined depending on whether the relative latency exceeds 50%.

In another embodiment, other threshold values other than 50% may be used in consideration of the relative latency graph as shown in FIG. 4. Since the threshold value can be determined by a person skilled in the art using a statistical analysis technique, a detailed description thereof will be omitted.

Thereafter, it is determined whether there exists a next pivot zone at S140. In this case, the next pivot zone means a zone that has not been used as the pivot zone.

If the next pivot zone does not exist, the operation is terminated. If the next pivot zone exists, the pivot zone is changed at S150, and the process moves to step S120 and repeats the above-described procedures.

Upon completion of the operation, the detection control circuit 11 may temporarily or permanently store the determination result on the zone parallelity between any two zones in the storage circuit 13, and the determination result may be provided to hardware or software that is using the SSD 20.

The hardware or software that is using the SSD 20 may control the SSD 20 in such manner as to improve performance when accessing the SSD 20 by using the detection results of the zone parallelity, the details of which are outside the scope of the present disclosure and the disclosure thereof is omitted.

Although various embodiments have been illustrated and described, various changes and modifications may be made to the described embodiments without departing from the spirit and scope of the invention as defined by the following claims.

What is claimed is:

1. A device for detecting zone parallelity, the device comprising:
   a detection control circuit configured to generate a first request and a second request for two zones among a plurality of zones included in a solid state drive (SSD); and
   an SSD controller configured to control the SSD by generating a first command and a second command corresponding to the first request and the second request, respectively,
   wherein the SSD controller schedules the first command and the second command, and
   wherein the detection control circuit determines zone parallelity of the two zones using response characteristics of the SSD for the first request and the second request.

2. The device of claim 1, further comprising a storage circuit configured to store a result of the determination of the zone parallelity of the two zones.

3. The device of claim 1, wherein the detection control circuit determines the zone parallelity of the two zones using a relative value of the response characteristics of the SSD.

4. The device of claim 3, wherein the response characteristics of the SSD include a latency, and the relative value includes a relative latency.

5. The device of claim 4, wherein the detection control circuit determines that there is no zone parallelity between the two zones when a relative latency exceeds 1.5.

6. A method for detecting zone parallelity of two zones, the method comprising:
   selecting the two zones from among a plurality of zones of a solid state drive (SSD);
   providing commands for the two zones to an SSD;
   measuring response characteristics of the SSD after providing the commands for the two zones to the SSD; and
   determining the zone parallelity of the two zones based on the response characteristics.

7. The method of claim 6, wherein determining the zone parallelity includes calculating a relative value from the response characteristics.

8. The method of claim 7, wherein the response characteristics include a latency, and the relative value includes a relative latency.

9. The method of claim 8, wherein determining the zone parallelity of two zones includes determining that there is no zone parallelity between the two zones when the relative latency exceeds 1.5.

10. The method of claim 6, wherein the result of determining the zone parallelity is used to optimize performance of accesses to the SSD.

\* \* \* \* \*